(12) United States Patent
Holmes et al.

(10) Patent No.: US 8,083,509 B2
(45) Date of Patent: Dec. 27, 2011

(54) UNDERWATER PELLETIZER

(76) Inventors: George A. Holmes, West Chicago, IL (US); Tadeusz Rybka, Streamwood, IL (US)

( * ) Notice: Subject to any disclaimer, the term of this patent is extended or adjusted under 35 U.S.C. 154(b) by 401 days.

(21) Appl. No.: 12/304,675

(22) PCT Filed: Jun. 18, 2007

(86) PCT No.: PCT/US2007/071481
§ 371 (c)(1),
(2), (4) Date: Dec. 12, 2008

(87) PCT Pub. No.: WO2007/147162
PCT Pub. Date: Dec. 21, 2007

(65) Prior Publication Data
US 2009/0269428 A1  Oct. 29, 2009

Related U.S. Application Data

(60) Provisional application No. 60/814,659, filed on Jun. 16, 2006.

(51) Int. Cl.
*B29B 9/06* (2006.01)
(52) U.S. Cl. .......................... 425/67; 425/313
(58) Field of Classification Search .............. 425/67, 425/313
See application file for complete search history.

(56) References Cited

U.S. PATENT DOCUMENTS

| | | | | |
|---|---|---|---|---|
| 3,912,434 A * | 10/1975 | Nagahara et al. | ............. | 425/142 |
| 4,019,414 A * | 4/1977 | Thomas et al. | .............. | 83/356.3 |
| 5,059,103 A * | 10/1991 | Bruckmann et al. | ............ | 425/67 |
| 7,520,458 B2 * | 4/2009 | Schulz | ........................ | 241/101.4 |
| 2002/0176905 A1* | 11/2002 | Fridley | .......................... | 425/67 |
| 2004/0009254 A1* | 1/2004 | Eloo et al. | ..................... | 425/311 |
| 2007/0003655 A1* | 1/2007 | Brandstaetter et al. | ....... | 425/313 |

* cited by examiner

*Primary Examiner* — Mary F Theisen
(74) *Attorney, Agent, or Firm* — Chifford Kraft

(57) ABSTRACT

An underwater pelletizer for cutting extruded plastic into a flow of liquid is disclosed. The pelletizer includes a cutter hub (90) carrying at least one cutter blade (96), a cutter shaft (60) for rotationally driving the cutter hub, and a flexible torque converter (80) for connecting a motor to the cutter hub. In one embodiment, the torque converter has a first set of bushings (82) that is fastened to a face (98) of the cutter hub and a second set of bushings that is fastened to a face (64) of the cutter shaft. The disclosed pelletizer has a shaft extension (20) configured to engage a motor shaft, the shaft extension having an outer diameter having formed thereon a splined portion (38) and first (26) and second (28) sealing surfaces. A disclosed motor adaptor (40) has a seal surface (44). A water chamber plate (50) may also have a seal surface (52). A first mechanical seal (48) is illustratively configured to engage the first seal surface (26) of the shaft extension and the seal surface (44) of the motor adaptor. A second mechanical seal (49) is illustratively configured to engage the second seal surface (28) of the shaft extension and the seal surface (52) of the water chamber plate. Furthermore, a cutter shaft (60) has a splined bore (62) formed therein for engaging the splined portion (38) of the shaft extension.

45 Claims, 11 Drawing Sheets

UNDERWATER PELLETIZER

FIELD OF THE INVENTION

This invention pertains to the field of underwater pelletizers, which are adapted to be mounted to the end of an extruder for cutting streams of plastic extruded through a die into pellets, which are carried away by water flow in a water chamber where the cutting takes place.

BACKGROUND OF THE INVENTION

Extruders for extruding plastic material from a molten stream of plastic material have been known and used for some time. One particular use of such an extruder is in connection with a pelletizer assembly, which is mounted to the end of the extruder. In such a combination of an extruder and a pelletizer, a die having a plurality of holes therein is mounted at the end of the extruder and at the entrance to the pelletizer assembly and forms part of both. The pelletizer then includes a rotating cutter assembly having cutting blades positioned adjacent the die face from which streams of molten plastic material flow. The rotating cutter assembly cuts the streams of plastic material into pellets of various sizes depending upon the extrusion flow rate through the holes in the die and the speed of rotation of the cutter assembly.

Also, the flow of water through the chamber serves to carry the pellets away from the chamber.

In such a combined extruder and pelletizer assembly it is desirable to provide means for facilitating a smooth flow of the plastic material from the extruder to the die holes in the die. Also it is desirable to provide means for gaining easy access to the chamber for servicing the pelletizer, such as to replace worn cutting blades of the cutter assembly, to generally observe the formation of pellets by the rotating cutter assembly, and to clean the die.

It is also desirable to provide a long useful life for the cutting blades of the cutter assembly and die. That is to say, it is desirable to provide cutting blades that will last a long time. In addition, it is desirable to provide some means for automatically readjusting the position of the cutter assembly adjacent the die face as the space between the cutter assembly and the die face increases due to wear of the cutting blades. In this respect, it is desirable to keep the cutting blades juxtaposed to the die face to ensure clean cutting of the streams of plastic material into pellets.

U.S. Pat. No. 4,529,370 illustrates one example of a conventional underwater pelletizer.

Another example of a conventional underwater pelletizer is shown in U.S. Pat. No. 5,059,103. Some conventional components for pelletizers are shown in U.S. Pat. Nos. 4,621,996; 5,403,176; 5,624,688; and 6,332,765.

BRIEF SUMMARY OF THE INVENTION

An embodiment of an underwater pelletizer includes a flexible torque converter disc that engages a cutter hub having cutting blades and a cutter drive hub that is driven by a motor. The flexible torque converter disc accommodates misalignment between a motor shaft and a die face and maintains the cutting blades in contact with a die face during rotation. In a further refinement, mechanical seals are provided for a shaft extension to pass through a motor adaptor and a water chamber plate and provide for a high-pressure chamber. An access hole and a bore through the shaft extension permit a hub piston to be controlled by varying the pressure in the high pressure chamber in order to control the pressure of the cutting hub against the die face. In still another refinement, the water chamber has a water inlet and outlet arranged so that water pumped into the water chamber forms a vortex that rotates in the same direction as the rotation of the cutter hub. In a further refinement of this embodiment, the water chamber is fixedly attached to the motor adaptor and removably coupled to the die.

BRIEF DESCRIPTION OF THE DRAWINGS

An exemplary embodiment is described below with respect to the following drawings, wherein.

DETAILED DESCRIPTION OF THE INVENTION

Figure 1:
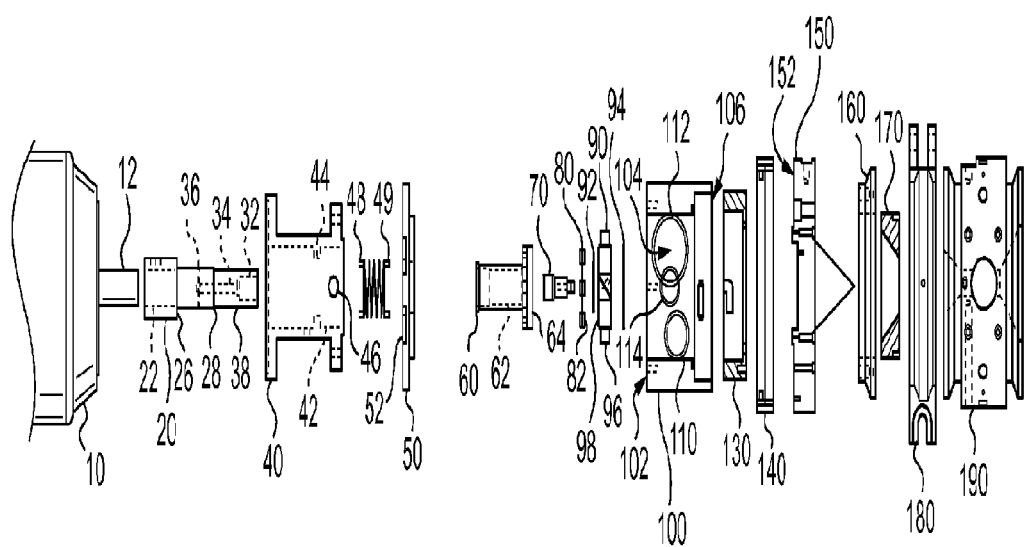
FIG. 1 is an exploded view showing individual components of an embodiment of a pelletizer with an automatic water chamber clamp.

It is desirable to maintain the cutting blades of an underwater pelletizer in contact with a die face of an extrusion die in order to produce pellets of relatively uniform size and shape, as well as to avoid jamming the cutting blades with extruded plastic.

One conventional cutting blade configuration present in devices produced by Gala Industries, Inc., includes a self-aligning cutting blade assembly that attaches to a motor shaft through a spherical coupling. The spherical coupling consists of a cut-away ball joint that is threaded for connection to a motor shaft. A pair of ball bearings and associated traces are used to implement a floating connection between the spherical coupling and the rest of the cutting blade assembly.

As the shaft rotates about a rotational axis, the spherical coupling permits the cutting blade assembly to float, e.g. move with respect to the rotational axis, in order to compensate for misalignment between the shaft and the die. The movement of the spherical coupling maintains the cutting blades in contact with the die face. However, the spherical coupling is used to transmit axial force for forcing the cutting blade assembly against the die face and radial force for rotating the cutting blade assembly using the motor shaft. Consequently, a large amount of force is focused on the ball bearing traces and they are prone to rapid wearing.

It is also desirable to provide for rapid cleaning of the cutting blades, die and water chamber, which must be cleared of excess extruded plastic in order to operate properly. Conventional underwater pelletizers provide for the plastic to be extruded through holes in the die face into a water chamber, where the plastic is cut by the cutting assembly. During start-up procedure the water chamber is flooded with plastic and it has to be manually removed by the operator. The water chamber is typically fixedly attached to the die and a motor adaptor with a water seal is removably coupled to the other end of the water chamber.

The water seals provided in conventional underwater pelletizers are typically oil seals, which tend to break down if subjected to significant levels of water pressure. Breakdown of the seals leads to water entering the motor assembly, which can damage the motor and requires replacement of the seals.

Conventional water chambers have a water intake on one side of the chamber, e.g. the bottom, for inflow of water and an outlet on another side, e.g. the top, for outflow of water and pelletized material. The resulting flow of material is in one direction through the chamber. The cutting blade assembly rotates within the water chamber in approximately the same plain as the vector of the water flow through the chamber. Consequently, the blades of the cutting blade assembly rotate substantially with the water flow through half their rotation and against the water flow through the other half of their rotation. As a result, a significant amount of power is required to drive the cutting blade assembly against the flow of water in the water chamber.

Conventional blades used in conventional cutting blade assemblies typically have two sharpened cutting edges that engage the die face for cutting plastic as it is extruded. These blades are sharpened on opposing edges of a body of the blade, where the cutting edge is formed on opposing planar sides of the body so that the blade can be removed and reversed when one cutting edge has worn out. The conventional blades typically have two bolt holes for bolting the blade into the cutting blade assembly so that the blade does not rotate out of position under load when the cutting blade assembly is engaged and rotated against the die face. The conventional blades wear out after the two cutting edges are used up.

FIG. 1 is an exploded view of an exemplary embodiment of an improved underwater pelletizer. A motor 10 has a shaft 12 that engages shaft extension 20. The shaft extension 20 passes through a motor adaptor 40 and water chamber plate 50 to engage cutter shaft 60. A dual mechanical shaft seal assembly 48 is used to provide a seal between the shaft extension 20 and motor adaptor 40 at both a motor side and a water chamber plate side. Another mechanical seal engages water chamber plate 50 and provides a seal for shaft extension 20 between motor adaptor 40 and water chamber plate 50. Shaft extension 20 also engages hub piston 70, which engages pressure plate 92 of cutter hub 90.

Water chamber housing 100 has a first open end 102 that is coupled to water chamber plate 50 such that cutter shaft 60 and cutter hub 90 are disposed within water chamber bore 104. A second open end 106 of water chamber housing 100 is adapted to engage die ring 130 and driven rotor 140 removably couples thru the set of eccentrically guided pins with radial bearings water chamber housing 100 to die 150. Die 150 is fixedly connected to die ring 130 on one side and to die clamp adaptor 160 on the other side, which engages clamp 180 for clamping die 150 to diverter valve 190. Flow distributing insert 170 facilitates annular flow of plastic from diverter valve 190 to die 150, where the plastic is extruded through holes in die face 152.

The shaft extension 20 has a first bore 22 for engaging shaft 12 of motor 10. A seal surface 26 is provided for seating a first mechanical shaft seal 48 against seal surface 44 of motor adaptor 40. Another seal surface 28 is provided for seating second mechanical shaft seal 49 against seal surface 52 of water chamber plate 50. When shaft extension 20 is assembled with motor adaptor 30 and water chamber plate 50 with mechanical shaft seals 48 and 49, a high-pressure chamber 42 is formed with motor adaptor 40 and water chamber plate 50, where the pressure in the high pressure chamber 42 may be controlled via pressure regulator 250 illustrated in FIG. 7.

Figure 7:
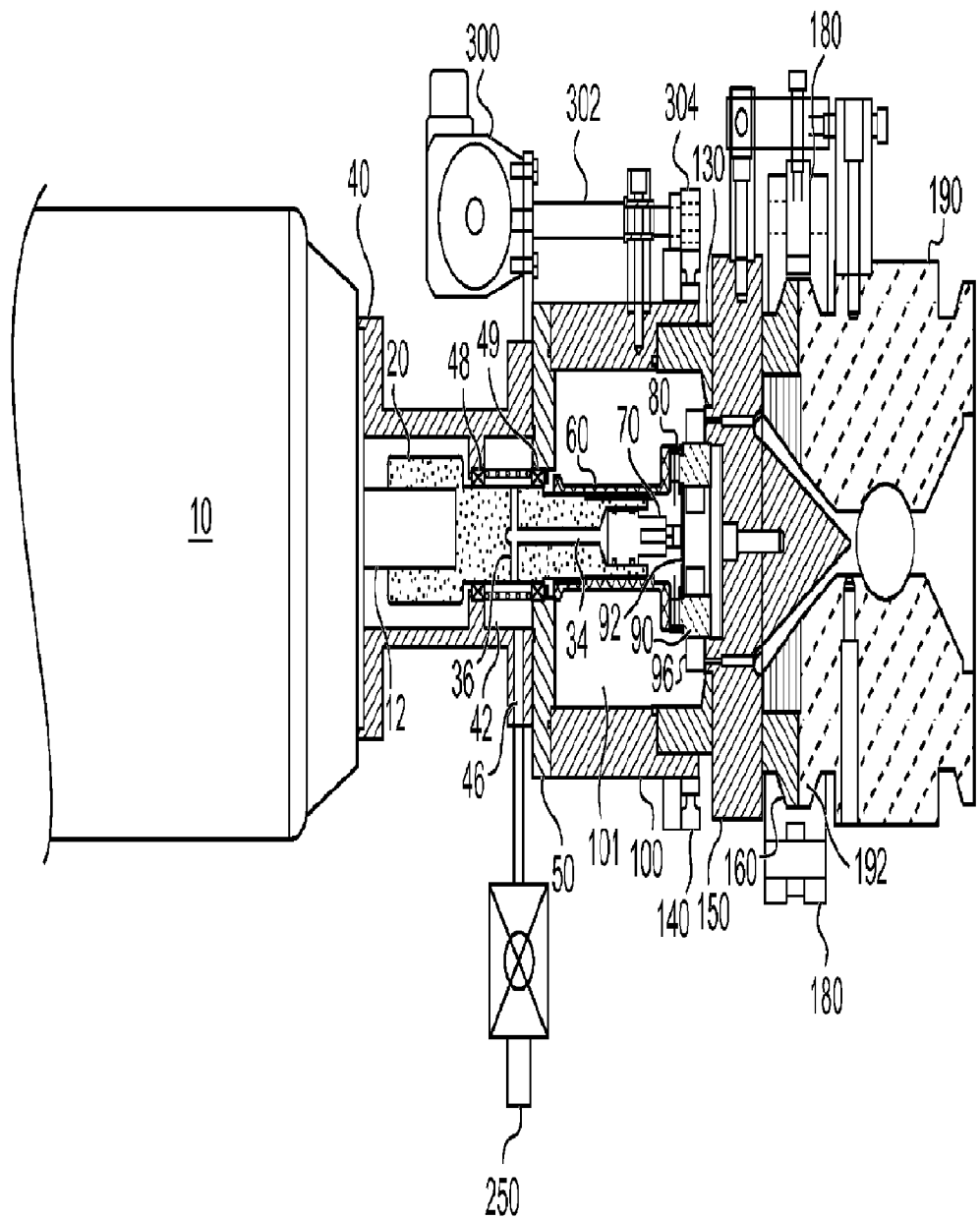
FIG. 7 is an assembled cross-sectional view of the underwater pelletizer of FIGS. 1 and 6 that also illustrates automated clamping and pressure actuation components.

Shaft extension 20 also includes piston chamber 32 for receiving hub piston 70. Piston chamber 32 is in communication with pressure access hole 36 via axial bore 34. When assembled, pressure access hole 36 is in communication with high-pressure chamber 42 of motor adaptor 40 and hub piston 70 is seated in piston chamber 32. Consequently, the axial force applied to pressure plate 92 of cutter hub 90 by hub piston 70 may be controlled by varying the pressure in high-pressure chamber 42 via pressure regulator 250 attached to pressure port 46, as illustrated in FIG. 7. Thus, the axial pressure of cutter hub 90 against die face 152 is externally controllable during operation of the pelletizer.

Motor shaft extension 20 has a splined outer surface region 38 that, when assembled, engages splined bore 62 of cutter shaft 60. Cutter shaft 60 has a flexible disc engagement face 64 that is formed to engage bushings 82 of flexible torque transmitting disc 80. Cutter hub 90 also has a disc engagement face 98 that is formed to engage bushings 82 of flexible torque transmitting disc 80. When assembled, rotary force generated by shaft 12 of motor 10 is transmitted through shaft extension 20 to cutter shaft 60 and from cutter shaft 60 through flexible torque transmitting disc 80 to cutter hub 90 in order to rotate the cutter blades 96 against die face 152 of die 150.

Flexible torque transmitting disc 80 is a standard torque-transmitting device that is a generally available power transmission product frequently used in other power transmission applications. In the present embodiment, disc 80 is constructed of laminated sheets of stainless steel that permits approximately 5° of movement. The stainless steel prevents disc 80 from corroding due to contact with water in water chamber housing 100. The flexibility of disc 80 permits it to accommodate both angular and parallel misalignment between motor shaft 12 and die 150. Disc 80 transmits only rotary force from cutter shaft 60 to cutter hub 90 and transmits no axial force necessary to keep the blades 96 attached to the cutter hub 90 against die face 152.

Note that the cutter hub 90, cutter shaft 60, blades 96, flexible disc 80 and die 150 arrangement operates to maintain substantially consistent pressure of the blades against the die face 152. This results in blades 96 self-sharpening as they rotate against the die face 152. By avoiding uneven wear of the die face 152, the present arrangement can extend the operational life of the die 150.

As shown in FIG. 1, water chamber housing 100 has a water inlet opening 110, a water outlet opening 112, and a drain outlet 114. The water inlet 110 and water outlet 112 are formed in the water chamber housing such that they are substantially parallel and adjacent to one another. When the pelletizer is assembled, the water inlet 110 and outlet 112 are arranged with respect to the rotation of cutter hub 90 so that a water vortex is formed within water chamber housing 100 that rotates in the same direction as cutter hub 90. The resulting arrangement substantially reduces the amount of power required to rotate cutter hub 90 while cutting extruded plastic. It also results in improved pellet removal and reduces jamming.

In the pelletizer of FIG. 1, water chamber housing 100 is fixedly attached, e.g. bolted, to water chamber plate 50, which is connected to motor adaptor 40. In this embodiment, water chamber housing 100 is formed with an automatic clamp fitting for engaging die ring 130 via an automatic clamp rotor 140, which is discussed in further detail below with regard to FIG. 7. When the pelletizer is assembled, water chamber housing 100 is fixedly attached to motor 10 and removably coupled to the die ring 130 and the die 150 via a clamping mechanism.

If an automated clamp mechanism is used in conjunction with a melt diverting valve and automatic water bypass system, then the start-up and shut-down process for the pelletizer can be fully automated. This arrangement substantially improves system efficiency and operator safety over manual procedure.

The embodiment of FIG. 1 includes a die clamp adaptor 160 for fixed attachment to die 150. The die 150 is then removably coupled to diverter valve 190 via quick clamp 180. This arrangement permits that both the front and back of die 150 are rapidly accessible for maintenance and cleaning.

Figure 2:
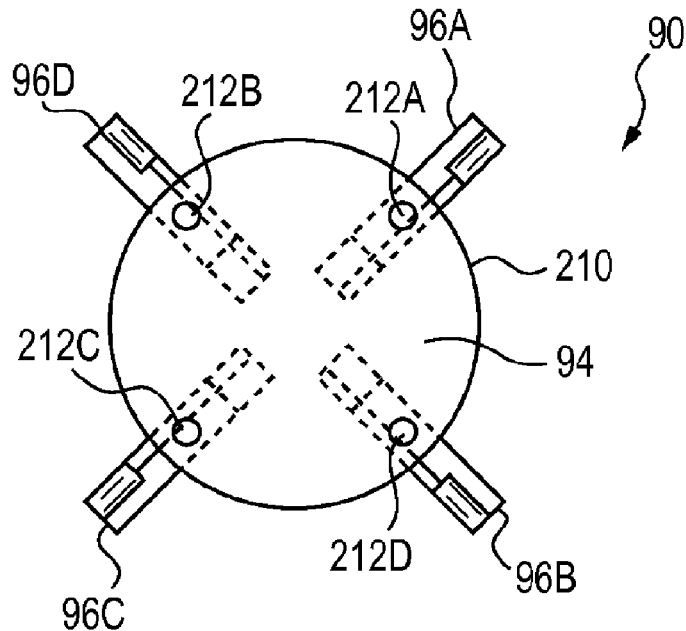
FIG. 2 is a front view of the cutting hub of FIG. 1.
Figure 3:
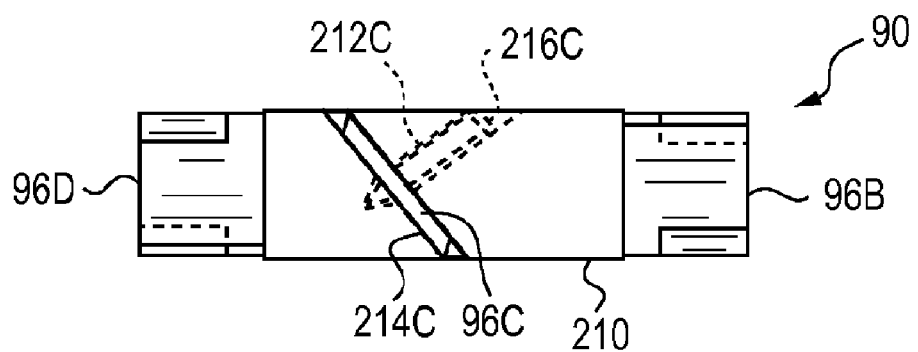
FIG. 3 is a side view of the cutting hub of FIG. 1.

FIGS. 2 and 3 show an exemplary embodiment of cutter hub 90 of FIG. 1. FIG. 2 is a front view of the cutter hub from the perspective of the die face 152 that faces hub lid 94. FIG. 3 is a side view of the cutter hub. Cutter hub 90 includes multiple cutter blades 96A-D arranged along a periphery of the cutter hub 90 and secured within slots formed in housing 210, e.g. slot 214C shown in FIG. 3. The slots are formed in housing 210 of cutter hub, and are wide enough to receive and hold securely a center portion 220 (shown in FIGS. 4 and 5) of each cutting blade 96. FIG. 3 shows slot 214C for mounting one of the blades 96C of FIG. 2. A drilled and tapped bore 212C is formed into housing 210 of hub 90 for insertion, in this example, of a conical tip set screw 216C for aligning and securing blade 96C within the housing 210 through screw hole 224 in the blade.

Figure 4:
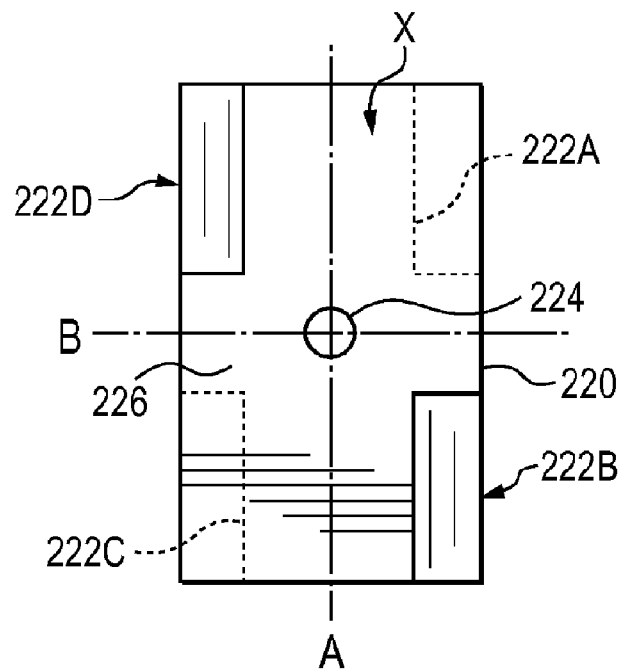
FIG. 4 is a top view of the cutting blade of FIGS. 1-3.
Figure 5:
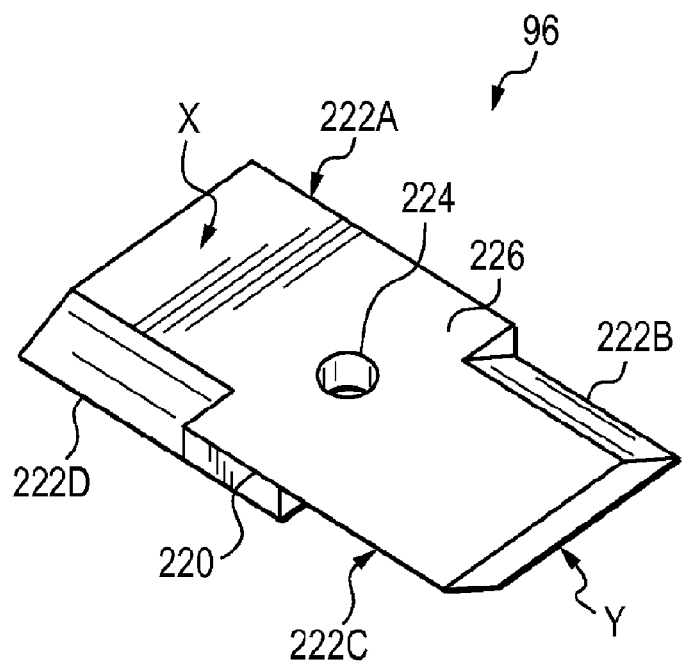
FIG. 5 is an isometric view of the cutting blade of FIGS. 1-4.

FIGS. 4 and 5 show an exemplary embodiment of cutting blades 96A-D. Each cutting blade 96 is substantially symmetrical along two perpendicular axes A and B. A central portion 220 of cutting blade 96 is positioned along axis B and has a substantially rectangular cross-section for holding the blade securely within slot 214 in the cutting hub housing 210. Each cutting blade has up to four cutting edges 222A-D formed into it, where the cutting edges are formed proximally from the central portion and perpendicular to axis A. The cutting edges 222A-D are formed on two opposing surfaces X and Y of blade 96. Diametrically opposed cutting edges are formed on the same surface. For example, edges 222A and 222C are formed on planar surface Y and edges 222B and 222D are formed on planar surface X. The resulting cutting blade 96 may be removed from cutter hub 90 and rotated so that all four edges 222A-D may be used for cutting before blade 96 is worn out. Removing and rotating blade 96 is accomplished by backing out set screw 216, rotating and/or reversing blade 96, and resetting set screw 216.

In a preferred embodiment, a single securing hole 224 is formed at the intersection of axes A and B of blade 96. The securing hole 224 is adapted to engage set screw 216 threaded through bore 212 in the cutter hub housing 210 that holds the cutting blade securely in place within cutter hub 90. This arrangement results in the cutting blade being self-aligning within cutter hub 90. The conical tip of set screw 216, along with the alignment of screw hole 224 and bore hole 212 combine to align blade 96 within the housing 210.

Figure 6:
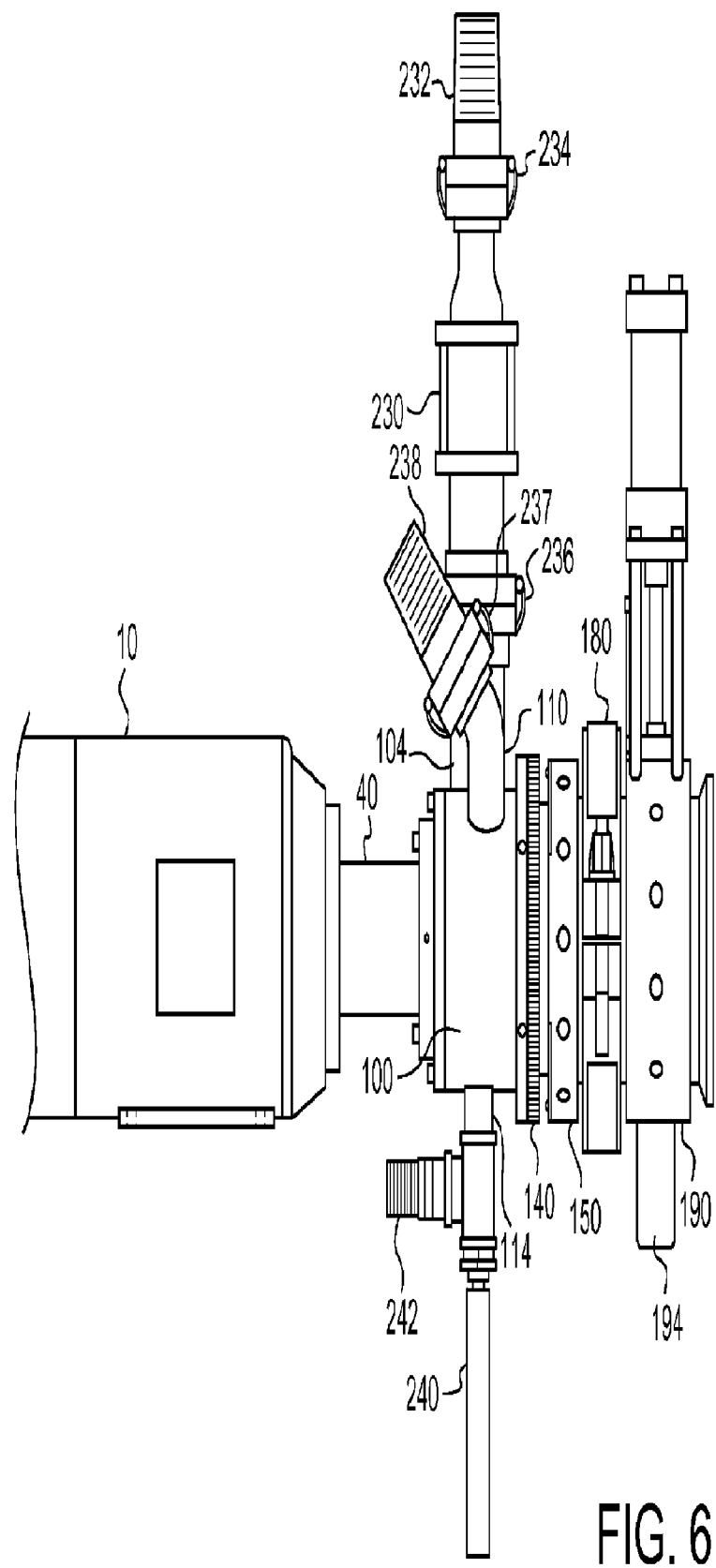
FIG. 6 is an assembled side view illustrating the water chamber housing of FIG. 1 and associated water circulation equipment.

FIG. 6 is an assembled side view illustrating the water chamber housing 100 of FIG. 1 fixedly coupled to motor adaptor 40 and motor 10 along with associated water circulation ports. Flow sight 230, which allows water and pelletized material to be observed leaving water chamber housing 100, is coupled to water outlet 112 via cam and groove coupling 236 and on top is coupled to hose fitting 232 via cam and groove coupling 234, where hose fitting receives a water and pellet hose typically for transporting the resulting pelletized material to a pellet dryer. Water inlet 110 is coupled to hose fitting 238 via cam and groove coupling 237, where hose fitting 238 receives a water supply line. Pneumatic valve 240 is coupled to drain outlet 114 and has a hose fitting 242 for receiving a hose for draining water chamber housing 100.

FIG. 7 is an assembled cross-sectional view of the underwater pelletizer of FIGS. 1 and 6 that also illustrates automated clamping and pressure actuation components. Motor 10 is secured to motor adaptor 40, which is secured to water chamber plate 50. Shaft extension 20 is coupled to motor shaft 12 and extends through high pressure chamber 42 formed within motor adaptor 40 along with shaft extension 20 and water chamber plate 50. Mechanical shaft seal 48 forms a high pressure seal between shaft extension 20 and motor adaptor 40. Mechanical shaft seal 49 forms a high pressure seal between shaft extension 20 and water chamber plate 50. In one example, mechanical shaft seals 48 and 49 are ceramic and graphite disc seals actuated by a stainless steel spring, which are widely used in other equipment applications.

A pressure regulator 250 (manual or electronic) is connected to supply port 46 and regulates the pressure in high-pressure chamber 42. The pressure in high-pressure chamber 42, in turn, affects the amount of force applied by hub piston 70 to pressure plate 92 of cutting hub 90 via pressure access hole 36 and axial bore 34. By controlling the pressure in high pressure air chamber 42, the amount of axial force applied by hub piston 70 to cutting hub 90 is controlled during pelletizer operation or blade lapping sequence.

Shaft extension 20 passes through water chamber plate 50 into water chamber 101 formed by water chamber housing 100. Cutter shaft 60 is fitted onto shaft extension 20 and is coupled to cutting hub 90 through flexible disc 80. The blades 96 of cutting hub 90 are pressed against the face of extrusion die 150 by hub piston 70. When motor shaft 12 rotates, shaft extension 20 also rotates causing cutter shaft 60, flexible disc 80 and cutting hub 90 to rotate in order to cut plastic extruded through holes in die 150.

In the embodiment of FIG. 7, clamp 180 is a hinged quick clamp for engaging die clamp adaptor 160, which is fastened to die 150, and a clamp flange 192 of diverter valve 190. An actuator 300 has a drive shaft 302 for rotationally driving driven gear 304. Driven gear 304 engages rotor 140 fastened to water chamber housing 100 in order to open or close water chamber 101. By automatically controlling actuator 300, pressure regulator 250, melt diverter valve 190 and a water bypass system start-up and shut-down of the pelletizer can be fully automated.

The water bypass system noted above diverts water from a hose connected to hose attachment 238 for water inlet 110 shown in FIG. 6 to a hose connected to hose attachment 232 connected to water outlet 112. This arrangement permits water chamber 100 to be automatically drained during a shut-down operation, but maintain the inertial flow of water in a water circulation system that attaches to hose attachments 232 and 238. This allows the time required to service an interruption of operation to be reduced.

Figure 8:
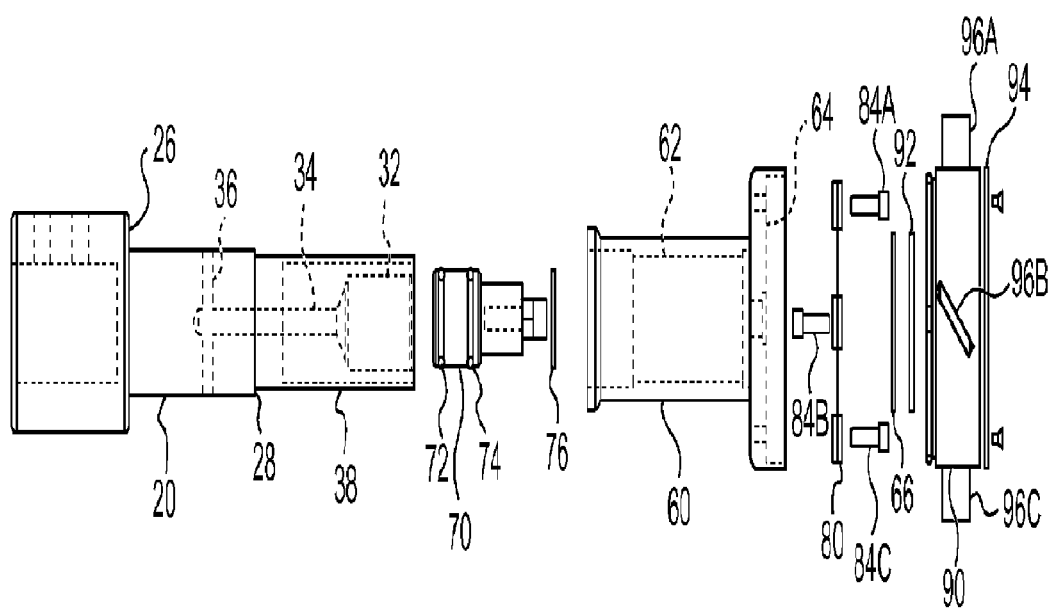
FIG. 8 is an exploded side view of the components of a cutter shaft assembly that includes a motor shaft extension, cutter shaft, hub piston, flexible disc coupling and cutter hub.

FIG. 8 is an exploded side view of the components of a cutter shaft assembly that includes shaft extension 20, cutter shaft 60, hub piston 70, flexible disc 80 and cutter hub 90. This expanded view illustrates o-rings 72 and 74 on hub piston 70, which form a seal between hub piston 70 and piston chamber 32 of shaft extension 20. As the pressure within high-pressure chamber 42 of FIG. 7 is varied, hub piston 70 moves within piston chamber 32. A retainer ring 76 seats into an end of shaft extension 20 and prevents hub piston 70 from being ejected from piston chamber 32.

Also shown in FIG. 8 are fasteners 84A-C for securing flexible hub 80 to cutter shaft 60 and cutting hub 90. In the embodiment shown, a pair of fasteners 84A and 84C secure disc 80 to drive shaft 60. Another pair of fasteners, fastener 84B and where the other fastener is obscured from view by fastener 84B, secures disc 80 to cutting hub 90. The fasteners are inserted through bushings on flexible disc 80 in an alternating fashion such that each pair of adjacent bushings on flexible disc 80 is secured to a different one of cutter shaft 60 and cutting hub 90. This arrangement permits the disc to flex in order to accommodate misalignment between cutter shaft 60 and cutting hub 90.

FIG. 8 also shows a retainer ring 66 that secures pressure plate 92 to cutter hub 90.

Figure 9:
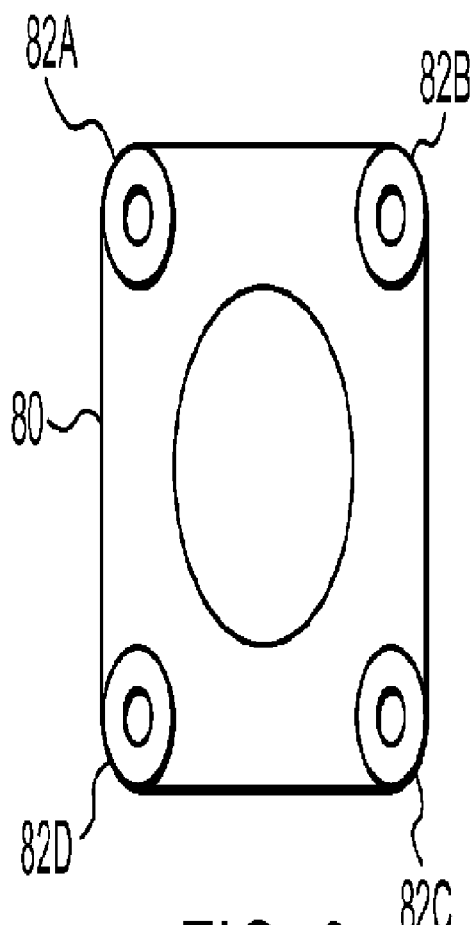
FIG. 9 is a frontal view of one embodiment of a flexible disc having four bushings and FIG. 10 is a side view of the same embodiment.
Figure 10:

FIG. 9 is a frontal view of one embodiment of flexible disc 80 having four bushings 82A-D and FIG. 10 is a side view of the same embodiment. As an example of securing flexible disc 80 in an alternating fashion, bushings 82A and 82C are secured to cutter shaft 60 and bushings 82B and 82D are coupled to cutter hub 90. Other arrangements are possible, as are other embodiments where there are a larger number of bushings utilized.

Figure 11:
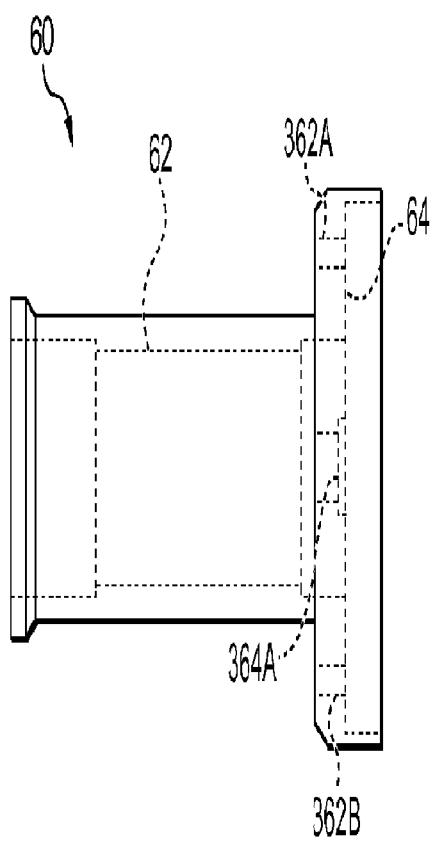
FIGS. 11 and 12 are side and frontal views, respectively, of an embodiment of a cutter shaft.
Figure 12:
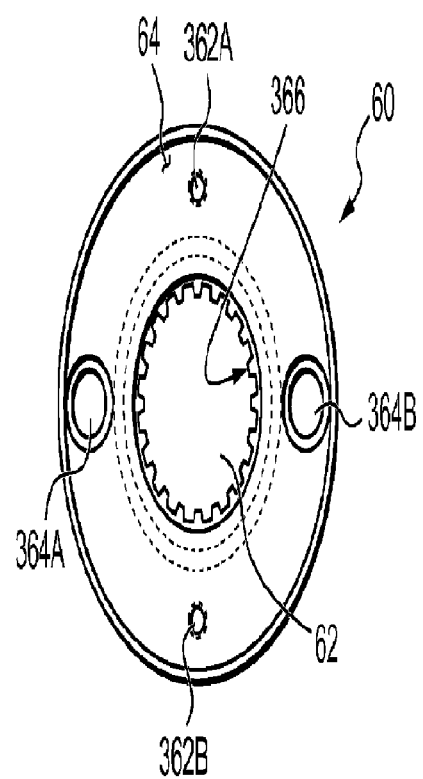

FIGS. 11 and 12 are side and frontal views, respectively, of an embodiment of cutter shaft 60. Note that disc engagement face 64 that is formed to engage bushings 82 of flexible torque transmitting disc 80 includes, in one exemplary embodiment, threaded bores 362A and 362B for receiving fasteners 84A and 84C of FIG. 8 for securing bushings 82A and 82C of flexible disc 80 to cutter shaft 60. Also note recesses 364A and 364B, which accommodate fastener 84B and another fastener that is obscured in FIG. 8 for securing bushings 82B and 82D to cutting hub 90. Note that recesses 364A and 364B are preferably sized larger than the heads of fastener 84B to allow for flexion in disc 80. Further note in FIG. 12 the splined surface 366 of splined bore 62 for receiving splined outer surface region 38 of shaft extension 20 shown in FIG. 14.

Figure 13:
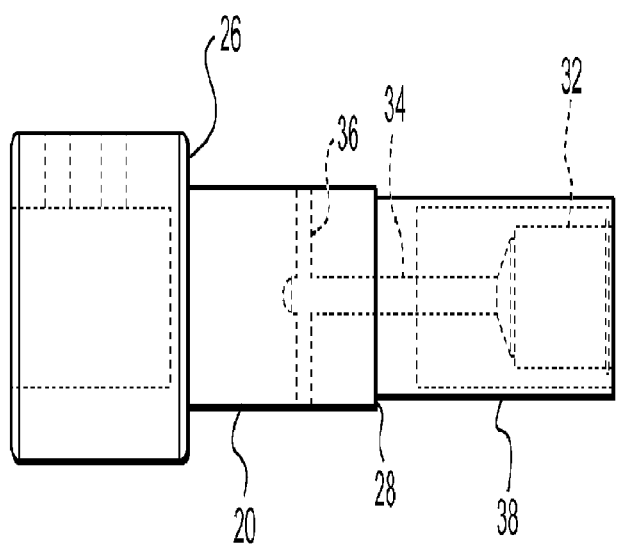
FIGS. 13 and 14 are side and frontal views, respectively, of an embodiment of a shaft extension.
Figure 14:
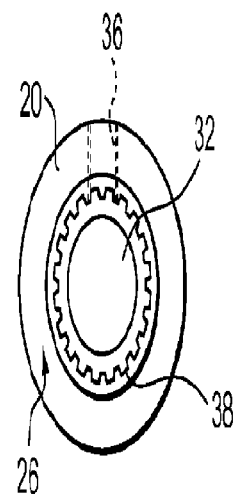

FIGS. 13 and 14 are side and frontal views, respectively, of an embodiment of shaft extension 20. As noted above, piston chamber 32 is in communication with pressure access hole 36 via axial bore 34 so that, when assembled, pressure access hole 36 is in communication with high-pressure chamber 42 of motor adaptor 40 shown in FIG. 7. Shaft extension 20 has a splined outer surface region 38 that, when assembled, engages splined bore 62 of cutter shaft 60.

Piston chamber 32 is in communication with pressure access hole 36 via axial bore 34, as further illustrated in FIG. 7. When assembled, as illustrated in FIG. 7, pressure access hole 36 is in communication with high-pressure chamber 42 of motor adaptor 40 and hub piston 70 is seated in piston chamber 32. Consequently, the axial force applied to pressure plate 92 of cutter hub 90 by hub piston 70 may be controlled by varying the pressure in high-pressure chamber 42 via pressure supply port 46. Thus, the axial pressure of cutter hub 90 against die face 152 is dynamically controllable during operation of the pelletizer or blade lapping sequence. p As shown in FIG. 14, shaft extension 20 has a splined outer surface region 38 that, when assembled, engages splined bore 62 of cutter shaft 60, shown in FIG. 12. The splines of splined bore 62 may be formed by gear cutting or honing the interior surface of bore 62, which results in a robust engagement of the shaft extension 20 to cutter shaft 60. Seal surface 26, shown in FIGS. 13 and 14, is provided for seating a mechanical shaft seal 48 against seal surface 44 of motor adaptor 40, shown in FIG. 1. Another seal surface 28, shown in FIG. 13, is provided for engaging second mechanical shaft seal against seal surface 52 of water chamber plate 50, shown in FIG. 1.

Figure 15:
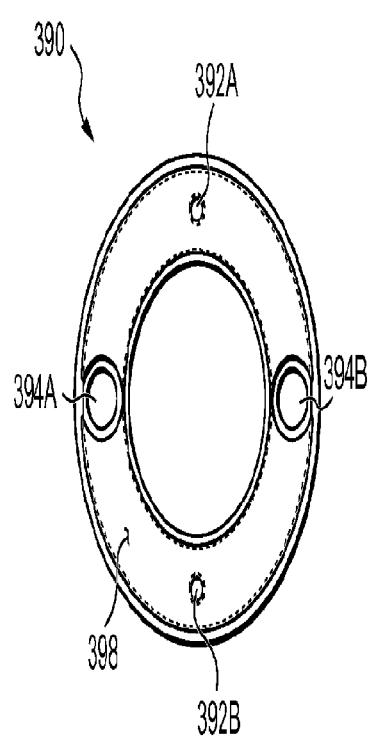
FIGS. 15, 16 and 17 are rear, side and frontal views, respectively, of an eight bladed embodiment of a cutter hub.
Figure 16:
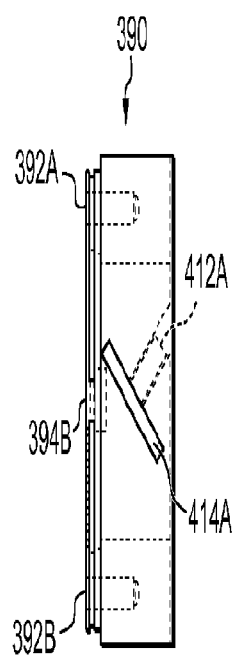
Figure 17:
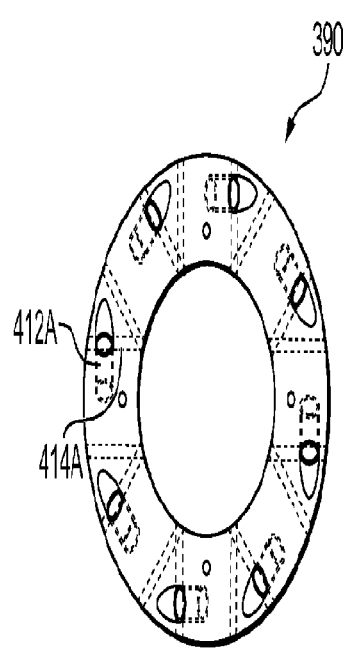

FIGS. 15, 16 and 17 are rear, side and frontal views, respectively, of an eight bladed embodiment of a cutter hub 90B. FIG. 14 shows a disc engagement face 398 that is formed to engage bushings 82 of flexible torque transmitting disc 80. In this embodiment, disc engagement face includes threaded bores 392A and 392B for receiving fastener 84B and another fastener that is obscured in FIG. 8 for securing bushings 82B and 82D to cutting hub 90. Also note recesses 394A and 394B, which accommodate fasteners 84A and 84C of FIG. 8 for securing bushings 82A and 82C of flexible disc 80 to cutter shaft 60. Note that recesses 394A and 394B are preferably sized larger than the heads of fasteners 84A and 84C to allow for flexion in disc 80.

Further note slot 414A formed in the body of hub 390 for receiving a cutting blade, such as those discussed above. A threaded bore 412A is formed at an angle and intersects slot 414A so that a set screw can be used to secure the cutting blade in place within slot 414A. Note that other configurations for cutter hub are possible, such as a six bladed embodiment.

Figure 18:
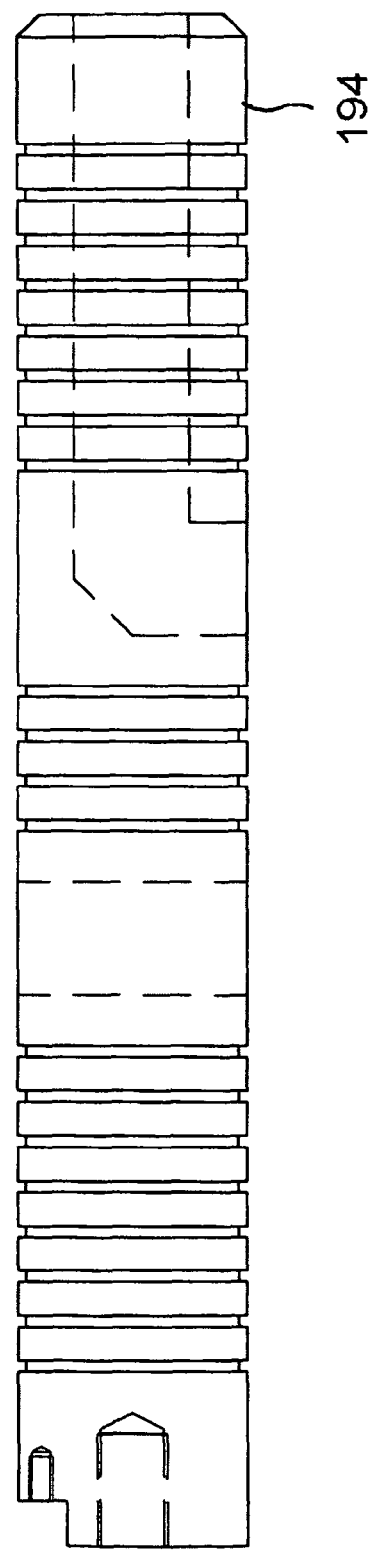
FIG. 18 is a side view of an embodiment of a piston for a diverter valve with grooves formed on a periphery of the piston.

In one embodiment, the diverter valve 190 shown in FIGS. 1 and 6 has a piston 194 with peripheral grooves formed thereon, as shown in FIG. 18. In this embodiment, the grooves are approximately ⅛ of an inch wide and deep. Because the diverter valve piston 194 is typically subject to tight tolerances, e.g. thousandths of an inch, with the diverter valve housing 190, the piston 194 is vulnerable to jamming due to contaminant particles, such as metal filings or wood splinters, that tend to jam conventional pistons. In this embodiment, the peripheral grooves trap the contaminant particles to prevent the particles from jamming the piston 194. Also, molten plastic within the diverter valve 190 tends to solidify within the grooves and helps form a seal between the piston 194 and the diverter valve 190.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention

What is claimed is:

1. An underwater pelletizer for cutting extruded plastic into a flow of liquid, the pelletizer comprising:
a cutter hub (90) carrying at least one cutter blade (96);
a cutter shaft (60) for rotationally driving the cutter hub; and
a flexible torque converter (80) for connecting a motor to the cutter hub, the torque
converter having a first set of bushings (82) that are fastened to a face (98) of the cutter
hub and a second set of bushings that are fastened to a face (64) of the cutter shaft.

2. The underwater pelletizer of claim 1, wherein:
the cutter hub includes a first set of recesses (392) formed in the face (98) of the cutter hub (90), each recess of the first set of recesses being configured to accommodate one of the first set of bushings (82) and permit the one of the first set of bushings to be
fastened to the cutter hub, and a second set of recesses (394) each recess of the second
set of recesses being configured to accommodate one of the second set of bushings; and the cutter shaft (60) includes a first set of recesses (362) formed in the face (64)
of the cutter shaft, each recess of the first set of recesses being configured to
accommodate one of the first set of bushings (82), and a second set of recesses (396)
each recess of the second set of recesses being configured to accommodate one of the
second set of bushings and permit the one of the second set of bushings to be fastened to the cutter shaft.

3. The underwater pelletizer of claim 2, wherein:
the cutter hub (90) includes a set of threaded holes formed in the first set of
recesses of the cutter hub, each threaded hole configured to receive a fastener inserted through an aperture in one of the first set of bushings; and
the cutter shaft (60) includes a set of threaded holes formed in the second set of recesses of the cutter shaft, each threaded hole configured to receive a fastener inserted
through an aperture in one of the second set of bushings.

4. The underwater pelletizer of claim 1, the pelletizer including:
a shaft extension (20) configured to engage a motor shaft, the shaft extension having an outer diameter having formed thereon a splined portion (38) for engaging the cutter shaft and first (26) and second (28) sealing surfaces;
a motor adaptor (40) having a seal surface (44);
a water chamber plate (50) having a seal surface (52);
a first mechanical seal (48) configured to engage the first seal surface (26) of the shaft extension and the seal surface (44) of the motor adaptor;
a second mechanical seal (49) configured to engage the second seal surface (28) of the shaft extension and the seal surface (52) of the water chamber plate; and
the cutter shaft (60) has a splined bore (62) formed therein for engaging the splined portion (38) of the shaft extension.

5. The underwater pelletizer of claim 4, wherein:
the shaft extension (20), the motor adaptor (40), the water chamber plate (50) and the first and second mechanical seals (48, 49) form a high pressure chamber (42) when assembled; and
the shaft extension has formed therein a piston chamber (32), an axial bore (34) 20 in communication with the piston chamber, and a pressure access hole (36) in communication with the axial bore and the high pressure chamber; and
the pelletizer further includes a hub piston (70) disposed in the piston chamber (32) and configured to apply pressure against the cutter hub (90).

6. The underwater pelletizer of claim 5, where the motor adaptor (40) has formed therein a pressure port (46) in communication with the high pressure chamber (42) and the pelletizer further includes a pressure regulator (250) coupled to the pressure port for controlling the pressure within the high pressure chamber.

7. The underwater pelletizer of claim 6, where the hub piston (70) is pneumatically controlled by the pressure regulator (250).

8. The underwater pelletizer of claim 6, where the hub piston (70) is hydraulically controlled by the pressure regulator (250).

9. The underwater pelletizer of claim 1, the pelletizer further comprising a water chamber housing (100) having formed therein a water inlet (110) and a water outlet (112), the water chamber housing being fixedly attached to the water chamber plate (50), where the water inlet and water outlet are positioned so that during operation a water vortex is formed within the water chamber housing that rotates in a same rotational direction as the cutter hub (90).

10. The underwater pelletizer of claim 9, wherein the water inlet (110) and the water outlet (112) are positioned substantially parallel and adjacent to one another.

11. The underwater pelletizer of claim 9, wherein the shaft extension (20) rotates on a rotational axis and the water inlet and water outlet are positioned at points offset from the rotational axis.

12. The underwater pelletizer of claim 9, wherein the pelletizer further includes:
a die (150) for extruding plastic;
a die ring (130) fixedly attached to the die;
the water chamber housing further includes an automatic clamp fitting for engaging the die ring; and
an automatic clamp rotor (140) for clamping the die to the automatic clamp fitting of the water chamber housing.

13. The underwater pelletizer of claim 9, the water chamber housing (100) having formed therein a drain outlet (114), the pelletizer further comprising a valve (240) coupled to the drain outlet (114) and has a hose fitting (242) for receiving a hose for draining the water chamber housing (100).

14. The underwater pelletizer of claim 13, the pelletizer further including a first hose fitting (238) coupled to water inlet (110) and a second hose fitting (232) coupled to the water outlet (114) and further including a bypass disposed between the first and second hose fittings for diverting water flow from the water chamber housing (100).

15. The underwater pelletizer of claim 1, wherein:
the at least one cutting blade (96) has a center portion (220) with a hole (224) formed therein; and
the cutter hub has a periphery with, for each cutting blade, a slot formed therein for securing the center portion of the cutting blade, and the cutter hub has further formed therein a tapped bore that intersects the slot for accommodating a set screw and, when assembled, the set 10 screw engages the hole formed in the cutting blade so that the set screw aligns the cutting blade.

16. The underwater pelletizer of claim 15, where the at least one cutting blade (96) has formed thereon four cutting edges (222A-D) proximate to the center portion, where the at least one cutting blade may be removed from the cutting hub and reinserted and secured in the cutting hub so that all four cutting edges may be used.

17. An underwater pelletizer for cutting extruded plastic into a flow of liquid, the pelletizer comprising:
a shaft extension (20) configured to engage a motor shaft, the shaft extension 20 having an outer diameter having formed thereon a splined portion (38) and first (26) and second (28) sealing surfaces;
a motor adaptor (40) having a seal surface (44);
a water chamber plate (50) having a seal surface (52);
a first mechanical seal (48) configured to engage the first seal surface (26) of the 25 shaft extension and the seal surface (44) of the motor adaptor;
a second mechanical seal (49) configured to engage the second seal surface (28) of the shaft extension and the seal surface (52) of the water chamber plate; and
a cutter shaft (60) having a splined bore (62) formed therein for engaging the splined portion (38) of the shaft extension.

18. The underwater pelletizer of claim 17, wherein:
the shaft extension (20), the motor adaptor (40), the water chamber plate (50) and the first and second mechanical seals (48, 49) form a high pressure chamber (42) when assembled; and
the shaft extension has formed therein a piston chamber (32), an axial bore (34) 5 in communication with the piston chamber, and a pressure access hole (36) in communication with the axial bore and the high pressure chamber; and
the pelletizer further includes a hub piston (70) disposed in the piston chamber (32) and configured to apply pressure against a cutter hub (90).

19. The underwater pelletizer of claim 18, where the motor adaptor (40) has formed therein a pressure port (46) in communication with the high pressure chamber (42) and the pelletizer further includes a pressure regulator (250) coupled to the pressure port for controlling the pressure within the high pressure chamber.

20. The underwater pelletizer of claim 19, where the hub piston (70) is pneumatically controlled by the pressure regulator (250).

21. The underwater pelletizer of claim 9, where the hub piston (70) is hydraulically controlled by the pressure regulator (250).

22. The underwater pelletizer of claim 17, the pelletizer further comprising a water chamber housing (100) having formed therein a water inlet (110) and a water outlet (112), the water chamber housing being fixedly attached to the water chamber plate (50), where the water inlet and water outlet are positioned so that during operation a water vortex is formed within the water chamber housing that rotates in a same rotational direction as the cutter hub (90).

23. The underwater pelletizer of claim 22, wherein the water inlet (110) and the water outlet (112) are positioned substantially parallel and adjacent to one another.

24. The underwater pelletizer of claim 22, wherein the shaft extension (20) rotates on a rotational axis and the water inlet and water outlet are positioned at points offset from the rotational axis.

25. The underwater pelletizer of claim 22, wherein the pelletizer further includes:
a die (150) for extruding plastic;
a die ring (130) fixedly attached to the die;
the water chamber housing further includes an automatic clamp fitting for engaging the die ring; and
an automatic clamp rotor (140) for clamping the die to the automatic clamp fitting of the water chamber housing.

26. The underwater pelletizer of claim 22, the water chamber housing (100) having formed therein a drain outlet (114), the pelletizer further comprising a valve (240) coupled to the drain outlet (114) and has a hose fitting (242) for receiving a hose for draining the water chamber housing (100).

27. An extruder for extruding plastic into a flow of liquid, the extruder comprising:
a motor (10) having a motor shaft (12),
a cutter hub (90) carrying a cutter blade (96),
a torque converter (80) for connecting the motor (10) to the cutter hub (90), and a plurality of bushings (64, 82) coupled to the torque converter (80) accommodating misalignment between the motor shaft (12) and the cutter hub (90).

28. The extruder of claim 27, further comprising a plurality of recesses (392) formed in a face (98) of the cutter hub (90), each recess (392) being configured to receive a bushing (82).

29. The extruder of claim 28, further comprising a fastener configured to be inserted through an aperture in one of the bushings.

30. The extruder of claim 27, said bushings allow for misalignment between the motor shaft and the cutter hub up to a pre-selected number of degrees of rotation.

31. The extruder of claim 27, further comprising a piston (70) connected to the cutter hub (90).

32. The extruder of claim 31, wherein the piston (70) is a hydraulic piston.

33. The extruder of claim 32, further comprising a pressurized fluid chamber (42) for containing pressurized fluid used to control the hydraulic piston.

34. The extruder of claim 33, wherein the piston (70) defines an axis and the pressurized fluid chamber is positioned along the axis of the piston.

35. The extruder of claim 33, further comprising a mechanical seal (48) for sealing the pressurized fluid chamber.

36. The extruder of claim 31, wherein the piston (70) is configured to move the cutter hub (90) toward and away from a cutter die (150).

37. The extruder of claim 27, further comprising a liquid chamber (100) configured to contain the liquid.

38. The extruder of claim 37, wherein the liquid is water.

39. The extruder of claim 37, wherein the liquid chamber (100) has an inlet (110) and an outlet (112).

40. The extruder of claim 39, wherein the outlet (112) is positioned on a portion of the liquid chamber (100) that is vertically disposed above the motor shaft (12).

41. The extruder of claim 40, wherein the motor shaft (12) defines a vertical axis, and the inlet (110) and outlet (112) are positioned at points offset from the vertical axis.

42. The extruder of claim 27, further comprising a quick-release clamp (180) configured to provide selectable access to the cutter hub (90).

43. The extruder of claim 27, wherein the cutter blade (96) comprises four cutting surfaces.

44. The extruder of claim 43, further comprising a set screw for engaging and positioning the cutter blade (96) on the cutter hub (90).

45. The extruder of claim 44, further comprising an aperture formed in the cutter blade (96), the aperture being configured to receive the set screw.

* * * * *